US009531821B2

(12) United States Patent
Itoh et al.

(10) Patent No.: US 9,531,821 B2
(45) Date of Patent: Dec. 27, 2016

(54) SERVER, DISTRIBUTION INFORMATION GENERATION METHOD, AND RECORDING MEDIUM

(71) Applicant: YAHOO JAPAN CORPORATION, Tokyo (JP)

(72) Inventors: Shinsuke Itoh, Tokyo (JP); Ai Ito, Tokyo (JP); Chihiro Sugioka, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 243 days.

(21) Appl. No.: 14/022,802

(22) Filed: Sep. 10, 2013

(65) Prior Publication Data

US 2015/0067034 A1    Mar. 5, 2015

(30) Foreign Application Priority Data

Aug. 29, 2013 (JP) .................................. 2013-178633

(51) Int. Cl.
   *H04L 29/08* (2006.01)
   *H04W 64/00* (2009.01)
(52) U.S. Cl.
   CPC .............. *H04L 67/18* (2013.01); *H04W 64/00* (2013.01)
(58) Field of Classification Search
   CPC ................................ H04L 67/18; H04W 64/00
   (Continued)

(56) References Cited

U.S. PATENT DOCUMENTS

2006/0267841 A1* 11/2006 Lee et al. ...................... 342/463
2012/0170856 A1*  7/2012 Yamaguchi ................... 382/224
(Continued)

FOREIGN PATENT DOCUMENTS

JP    2002-152798 A    5/2002
JP    2008-178006 A    7/2008
(Continued)

OTHER PUBLICATIONS

Feb. 10, 2015 Office Action issued in Japanese Patent Application No. 2013-178633.
(Continued)

*Primary Examiner* — Viet Vu
*Assistant Examiner* — Herman Belcher
(74) *Attorney, Agent, or Firm* — Oliff PLC

(57) ABSTRACT

A server includes a terminal information acquisition unit, a region specifying unit, and a distribution information generation unit. The terminal information acquisition unit acquires from each of a plurality of first terminal devices, terminal information including measurement information used to calculate a distance from each of second terminal devices to each of the plurality of first terminal devices for each second terminal device present near the first terminal device and position information of the first terminal device. The region specifying unit specifies a region in which the second terminal device is disposed at a distance according to the measurement information from the position of each of the first terminal devices. The distribution information generation unit generates the information indicating the distribution of the positions of the first terminal device and the second terminal device based on the region specified by the region specifying unit.

13 Claims, 12 Drawing Sheets

(58) Field of Classification Search
USPC .......................................................... 709/203
See application file for complete search history.

(56) References Cited

U.S. PATENT DOCUMENTS

2012/0245881 A1* 9/2012 Takaoka ........................ 702/128
2012/0289148 A1* 11/2012 Aaron ................. H04W 72/085
　　　　　　　　　　　　　　　　　　　　　　　　455/7
2012/0309336 A1* 12/2012 Tanaka et al. ............. 455/226.2

FOREIGN PATENT DOCUMENTS

| JP | A-2009-44394 | 2/2009 |
|----|---------------|--------|
| JP | 2009-528546 A | 8/2009 |
| JP | 2012-257245 A | 12/2012 |
| JP | 2013-124885 A | 6/2013 |
| WO | 2007/103821 A2 | 9/2007 |

OTHER PUBLICATIONS

Aug. 16, 2016 Office Action issued in Japanese Patent Application No. 2015-133762.

* cited by examiner

| TERMINAL ID | RSSI | UPDATE TIME |
|---|---|---|
| E011 | -75 dBm | 13:56:47 |
| E012 | -98 dBm | 13:54:11 |
| E013 | -49 dBm | 13:56:40 |
| ⋮ | ⋮ | ⋮ |

| CELL ID | SCORE |
|---------|-------|
| C001 | 1.31 |
| C002 | 0.85 |
| C003 | 2.01 |
| ⋮ | ⋮ |

SERVER, DISTRIBUTION INFORMATION GENERATION METHOD, AND RECORDING MEDIUM

CROSS-REFERENCE TO RELATED APPLICATIONS

The present application claims priority to and incorporates by reference the entire contents of Japanese Patent Application No. 2013-178633 filed in Japan on Aug. 29, 2013.

BACKGROUND OF THE INVENTION

1. Field of the Invention

The present invention relates to a server, a distribution information generation method, and a recording medium.

2. Description of the Related Art

As disclosed in Japanese Laid-open Patent Publication No. 2009-44394, a plurality of relay devices are installed in advance within a place such as an exhibition and the strengths of radio waves transmitted from radio sensors carried by participants are measured by the relay devices. An analysis device has map information of the place associated with the positions of the relay devices, and thus collects the strengths of the radio waves received from the radio sensors from the respective relay devices. Then, the analysis device specifies locations of distances according to the strengths of the radio waves received by the relay devices as the positions of the radio sensors.

The technology disclosed in the above-described patent publication, it is necessary to install the plurality of relay devices in advance in the place. For this reason, installation cost or work load of the device installation may be considerable. Accordingly, in a temporary store or temporarily installed equipment, it is difficult to use the technology disclosed in the above-described patent publication.

SUMMARY OF THE INVENTION

It is an object of the present invention to at least partially solve the problems in the conventional technology.

A server includes a terminal information acquisition unit, a region specifying unit, and a distribution information generation unit. The terminal information acquisition unit acquires from each of a plurality of first terminal devices, terminal information including measurement information used to calculate a distance from each of second terminal devices to each of the plurality of first terminal devices for each second terminal device present near the first terminal device and position information of the first terminal device. The region specifying unit specifies a region in which the second terminal device is disposed at a distance according to the measurement information from the position of each of the first terminal devices. The distribution information generation unit generates the information indicating the distribution of the positions of the first terminal device and the second terminal device based on the region specified by the region specifying unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Overview of Process

Figure 1:
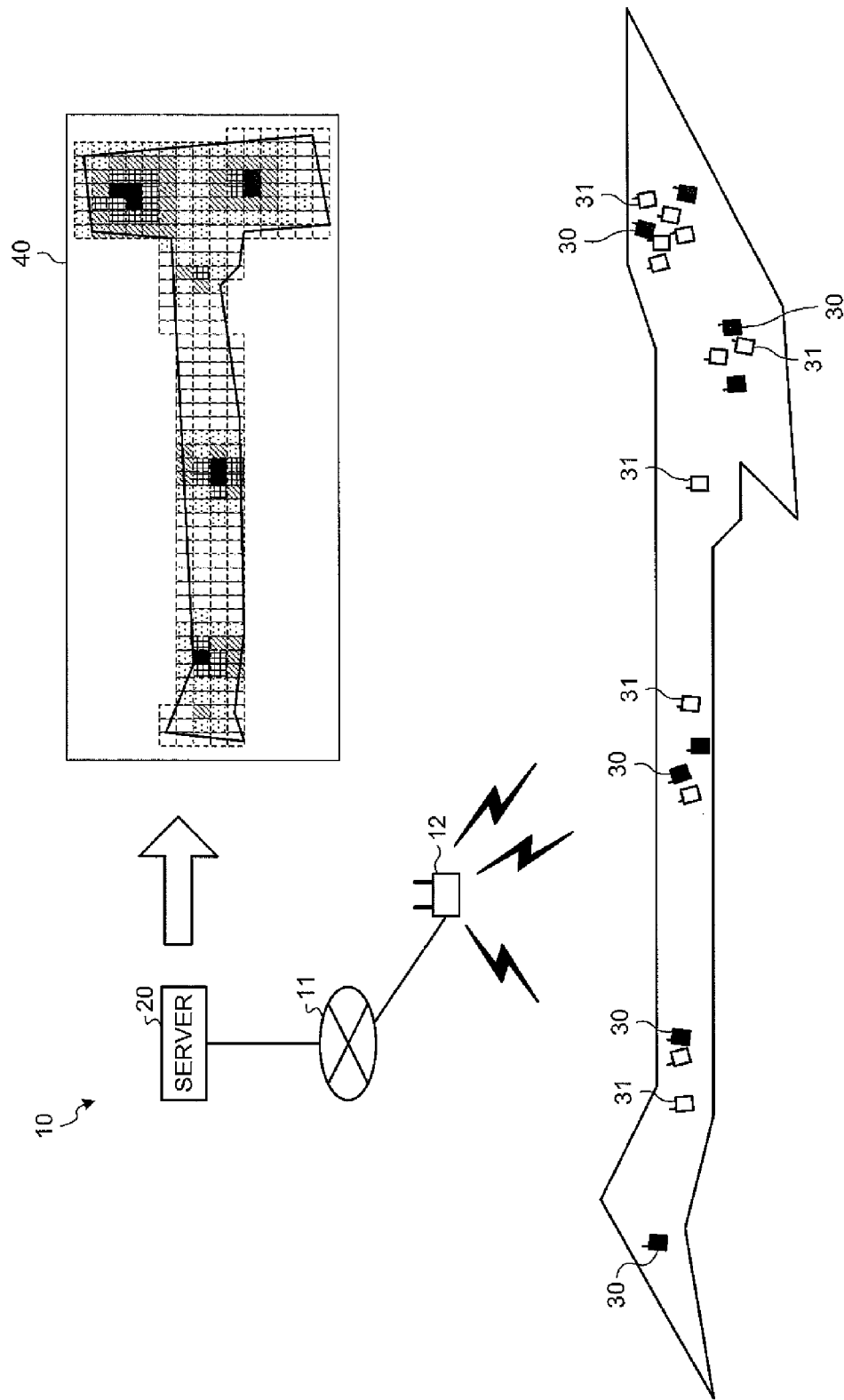
FIG. 1 is a conceptual diagram illustrating an example of an overview of processing according to an embodiment.

FIG. 1 is a conceptual diagram illustrating an example of an overview of a process according to an embodiment. A distribution information generation system 10 according to this embodiment includes a server 20 and a plurality of first terminal devices 30.

Each first terminal device 30 is, for example, a smartphone, a cellular phone, or a personal digital assistant (PDA) and has a position measurement function. Each first terminal device 30 performs communication via an access point 12 connected to a communication line 11 to transmit and receive communication data to and from the server 20, another server, or other terminal devices.

Each second terminal device 31 is, for example, a smartphone, a cellular phone, or a PDA and is a terminal device which has no position measurement function or in which a position measurement function does not operate. Each second terminal device 31 performs communication via the access point 12 connected to the communication line 11 to transmit and receive communication data to and from the server 20, another server, or other terminal devices.

During a non-communication period, each first terminal device 30 measures reception strengths (Received Signal Strength Indicators (RSSI)) of radio waves transmitted by the other first terminal devices 30 or the other second terminal devices 31, associates the reception strengths with terminal IDs used to identify the terminal devices, and holds the reception strengths and the terminal IDs as terminal information. For example, each of the first terminal devices 30 and the second terminal devices 31 has a function of performing communication in conformity with a time division duplex (TDD) scheme for a cellular phone, a personal handy-phone system (PHS), a wireless LAN, Bluetooth (registered trademark), Zigbee (registered trademark), or the like.

When each the first terminal devices 30 and the second terminal devices 31 is a terminal device that performs communication in conformity with a frequency division duplex (FDD) scheme, each first terminal device 30 may be configured to measure RSSIs of the radio waves transmitted by the other first terminal devices 30 or the other second terminal devices 31 by providing a function of measuring an RSSI at a frequency of an uplink line.

Each first terminal device 30 analyzes signals indicated by the radio waves transmitted by the other first terminal devices 30 or the other second terminal devices 31 and extracts identification information of the terminal device serving as a transmission source as a terminal ID.

When the first terminal devices 30 and the second terminal devices 31 perform communication through, for example, a wireless LAN, each first terminal device 30 extracts, for example, information regarding a MAC address of a transmission source included in the header of a probe request or a communication frame as a terminal ID. Further, when the first terminal devices 30 and the second terminal devices 31 perform communication through, for example, a communication scheme of a cellular phone or a PHS, each first terminal device 30 may extract, for example, terminal identification information included in a transmission packet for registration as a terminal ID.

Each first terminal device 30 calculates a distance up to a radio wave transmission source based on, for example, RSSIs of radio waves transmitted from the radio waves transmission sources installed at existing positions. Then, the first terminal device 30 calculates the position of the first terminal device 30 based on the distances from three or more radio wave transmission sources. In this embodiment, the radio wave transmission sources are, for example, access points of a wireless LAN.

Each first terminal device 30 calculates the position of the first terminal device 30 at predetermined timing intervals (for example, intervals of 1 minute) and transmits the held terminal information together with position information indicating the calculated position to the server 20 via the access point 12.

The server 20 holds the terminal information and the position information transmitted from each first terminal device 30 via the communication line 11. Then, the server 20 generates information indicating a distribution of the positions of the first terminal devices 30 and the second terminal devices 31 at predetermined timing intervals (for example, intervals of 1 minute) based on the position information and the terminal information of the first terminal devices 30. When the server 20 receives a distribution information request from each of the first terminal devices 30 or the second terminal devices 31, the server 20 generates and supplies distribution information 40 indicating a distribution of the positions of the first terminal devices 30 and the second terminal devices 31.

The distribution information 40 is, for example, an image shows that a target area is divided into small regions (cells) with a predetermined size and a display pattern of the cells is changed according to the number of terminal devices which are likely to be located at the cells. Since the first terminal devices 30 and the second terminal devices 31 are carried by people, there is a high possibility of people being also present at places at which the first terminal devices 30 and the second terminal devices 31 are present. Therefore, users of the first terminal devices 30 and the second terminal devices 31 can swiftly recognize where many people gather in the target area by browsing the distribution information 40.

Configuration of Terminal Device

Figures 2, 3:
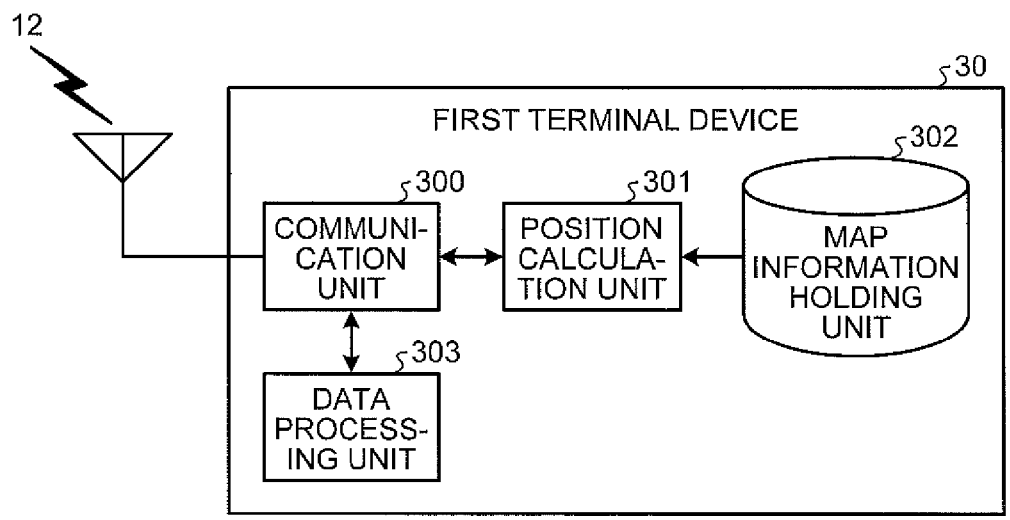
FIG. 2 is a block diagram illustrating an example of a functional configuration of a first terminal device.
FIG. 3 is a diagram illustrating an example of a data structure of an access point table held by a map information holding unit.

FIG. 2 is a block diagram illustrating an example of a functional configuration of the first terminal device 30. The first terminal device 30 includes a communication unit 300, a position calculation unit 301, a map information holding unit 302, and a data processing unit 303.

The map information holding unit 302 holds map information of a target area and an access point table indicating the position of each access point 12 disposed in the target area. FIG. 3 is a diagram illustrating an example of a data structure of an access point table 3020 held by the map information holding unit 302.

For example, as illustrated in FIG. 3, position information 3022 of the access point 12 is associated with an access point ID 3021 used to identify each access point 12 and is stored in the access point table 3020. FIG. 3 exemplifies the access point table 3020 in which position information 3022 of "$(x_1, y_1)$" is associated with access point ID 3021 of "A001" and is stored.

The communication unit 300 communicates with the neighboring access point 12 through, for example, a wireless LAN. The communication unit 300 measures RSSIs of radio waves received from the access point 12, associates the measured RSSIs with the access point ID of the access point 12, and transmits the RSSIs to the position calculation unit 301.

The communication unit 300 measures the RSSIs of the radio waves transmitted by the other first terminal devices 30 or the other second terminal devices 31. The communication unit 300 acquires the terminal ID of a terminal device serving as a transmission source based on the signals indicated by the radio waves transmitted by the other first terminal devices 30 or the other second terminal devices 31. The communication unit 300 associates the measured RSSIs with the acquired terminal ID and transmits the RSSIs to the position calculation unit 301.

When the communication unit 300 receives the terminal information from the position calculation unit 301, the communication unit 300 transmits the received terminal information together with the terminal ID of the first terminal device 30 serving as the transmission source to the server 20 via the access point 12.

The data processing unit 303 realizes an application function of a telephone call, a Web browser, or the like. The communication unit 300 transmits data received from the data processing unit 303 to another device via the access point 12. The communication unit 300 transmits data received from another device via the access point 12 to the data processing unit 303.

The position calculation unit 301 receives the RSSI from each first terminal device 30 or each second terminal device 31 and the RSSI from each access point 12 from the communication unit 300. The position calculation unit 301 calculates a distance from each access point 12 based on the RSSI from each access point 12 at predetermined timing intervals. A relation between the RSSI of a radio wave transmitted from a radio wave transmission source and a distance up to the radio wave transmission source is illustrated in, for example, FIG. 4.

Figure 4:
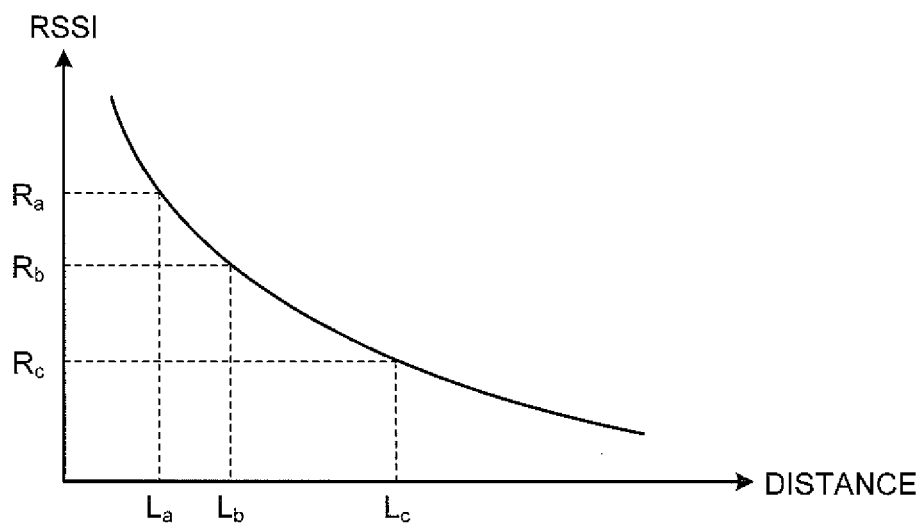
FIG. 4 is a conceptual diagram illustrating a relation between an RSSI and a distance.

For example, when the RSSI of a radio wave transmitted from an access point 12a is "$R_a$", the position calculation unit 301 calculates a distance as "$L_a$" from the first terminal device 30 to the access point 12a based on the relation illustrated in FIG. 4. When the RSSI of a radio wave transmitted from an access point 12b is "$R_b$", the position calculation unit 301 calculates a distance as "$L_b$" from the first terminal device 30 to the access point 12b. When the RSSI of a radio wave transmitted from an access point 12c is "$R_c$", the position calculation unit 301 calculates a distance as "$L_c$" from the first terminal device 30 to the access point 12c.

Figure 5:
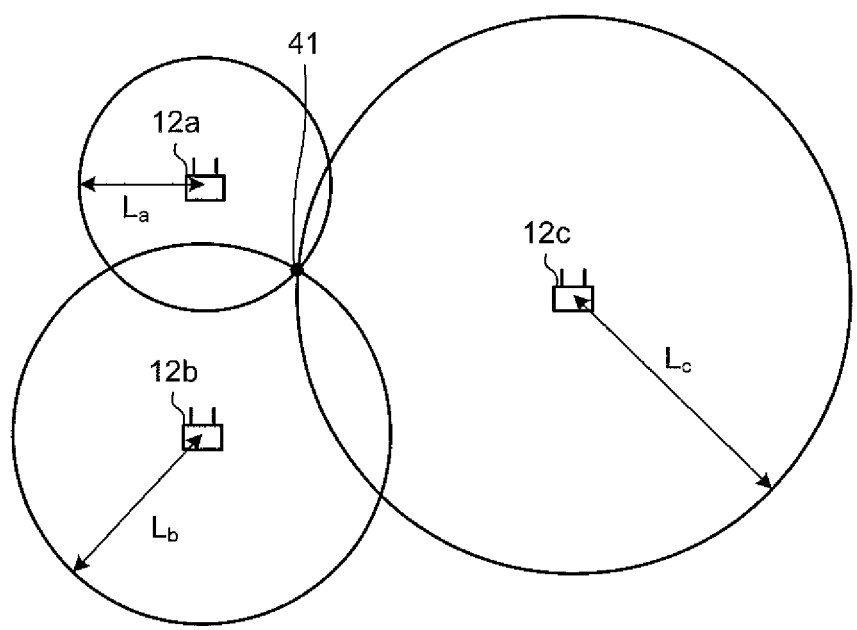
FIG. 5 is a conceptual diagram illustrating a principle of position measurement.

For example, as illustrated in FIG. 5, the position calculation unit 301 obtains a position 41 located at a distance corresponding to the RSSI from each access point 12 and calculates the obtained position 41 as position information of the first terminal device 30. Then, the position calculation unit 301 generates terminal information including the RSSI from each first terminal device 30 or each second terminal device 31 received from the communication unit 300 and the calculated position information and transmits the generated terminal information to the communication unit 300.

The second terminal device 31 has the same configuration as the first terminal device 30 and is different from the first terminal device 30 in that the position calculation unit 301 and the map information holding unit 302 are not included. The communication unit 300 of the second terminal device 31 may not have an RSSI measurement function.

Configuration of Server

Figures 6, 7:
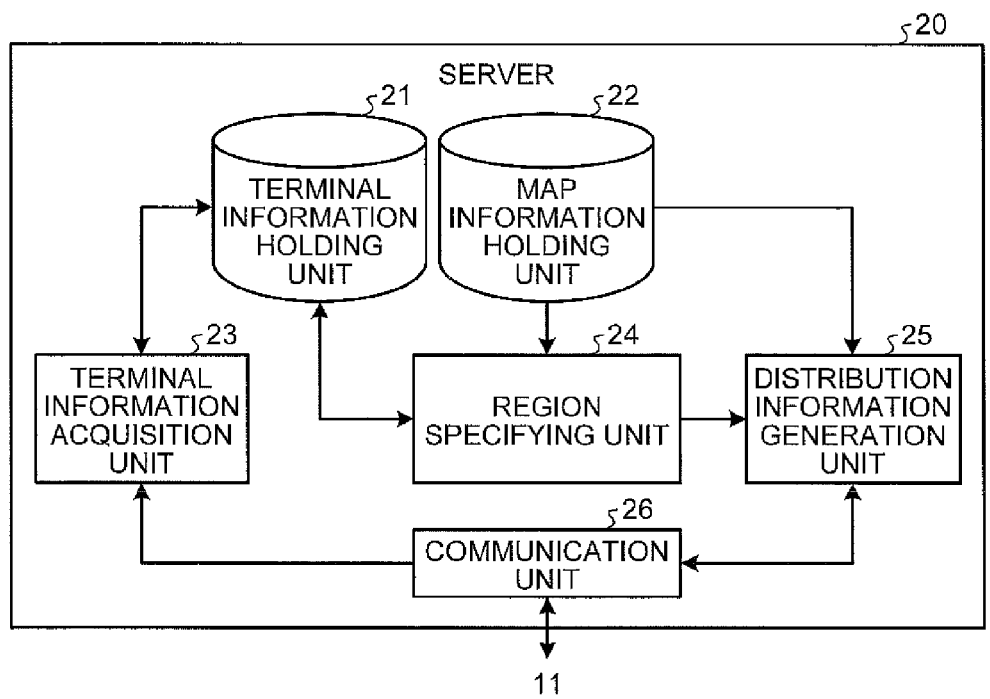
FIG. 6 is a block diagram illustrating an example of a functional configuration of a server.
FIG. 7 is a diagram illustrating an example of a data structure of a first terminal table held by a terminal information holding unit.

FIG. 6 is a block diagram illustrating an example of a functional configuration of the server 20. The server 20 includes a terminal information holding unit 21, a map information holding unit 22, a terminal information acquisition unit 23, a region specifying unit 24, a distribution information generation unit 25, and a communication unit 26.

The terminal information holding unit 21 holds a first terminal table 210 and a second terminal table 211. FIG. 7 is a diagram illustrating an example of a data structure of the first terminal table 210 held by the terminal information holding unit 21. For example, as illustrated in FIG. 7, records 2103 are stored in the first terminal table 210. Each record 2103 includes a terminal ID 2100 used to identify each first terminal device 30, position information 2101 of the first terminal device 30, and an update time 2102 indicating a time at which the position information 2101 is stored in the first terminal table 210. FIG. 7 exemplifies the first terminal table 210 in which the position information 2101 of "($x_{10}$, $y_{10}$)", and the update time 2102 of "13:57:47", are associated with the terminal ID 2100 of "E001", and are stored.

Figures 8, 9:
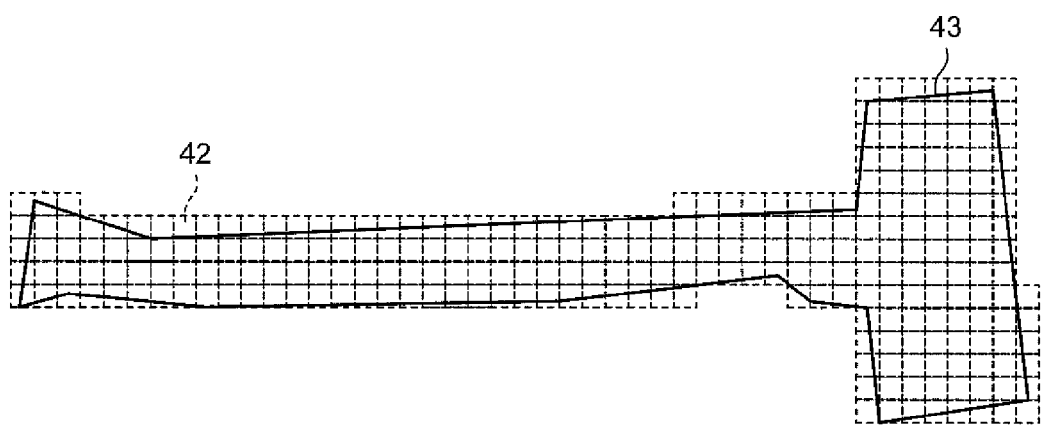
FIG. 8 is a diagram illustrating an example of a data structure of a second terminal table held by the terminal information holding unit.
FIG. 9 is a conceptual diagram illustrating an example of a map held by a map information holding unit.

FIG. 8 is a diagram illustrating an example of a data structure of the second terminal table 211 held by the terminal information holding unit 21. For example, as illustrated in FIG. 8, an individual terminal table 2111 is associated with a terminal ID 2110 used to identify each first terminal device 30 and is stored in the second terminal table 211. For example, as illustrated in FIG. 8, records 2115 are stored in each individual terminal table 2111. Each record 2115 includes a terminal ID 2112 used to identify each second terminal device 31, an RSSI 2113, and an update time 2114.

The RSSI 2113 indicates a reception strength of a radio wave which the first terminal device 30 corresponding to the terminal ID 2110 receives from the second terminal device 31 corresponding to the terminal ID 2112. The update time 2114 indicates a time at which the RSSI 2113 is updated. FIG. 8 exemplifies the second terminal table 211 in which the RSSI 2113 of "−75 dBm", and the update time 2114 of "13:56:47", are associated with the terminal ID 2112 of "E011", and are stored in the individual terminal table 2111 associated with the terminal ID 2110 of "E001".

FIG. 9 is a conceptual diagram illustrating an example of a map 43 held by the map information holding unit 22. The map 43 indicating a target area is divided into small regions as cells 42, with a predetermined size and a cell ID used to identify each cell 42 is allocated to each cell 42.

Referring back to FIG. 6, the description will be continued. When the communication unit 26 receives the terminal information and the terminal ID via the communication line 11, the communication unit 26 transmits the received terminal information and the received terminal ID to the terminal information acquisition unit 23. When the communication unit 26 receives a distribution information request via the communication line 11, the communication unit 26 transmits the received distribution information request to the distribution information generation unit 25. When the communication unit 26 receives the distribution information from the distribution information generation unit 25, the communication unit 26 transmits the received distribution information to the transmission source of the distribution information request via the communication line 11.

When the terminal information acquisition unit 23 receives the terminal information and the terminal ID from the communication unit 26, the terminal information acquisition unit 23 deletes a pair of the terminal ID and the RSSI from the first terminal device 30 among the terminal IDs included in the received terminal information. Specifically, the terminal information acquisition unit 23 specifies the terminal ID included in the first terminal table 210 in the terminal information holding unit 21 among the terminal IDs included in the terminal information received from the communication unit 26.

The terminal information acquisition unit 23 deletes the specified terminal ID and the RSSI associated with this terminal ID from the terminal information received from the communication unit 26. The reason for deleting the RSSI from the first terminal device 30 from the terminal information is that the position information of the first terminal device 30 is stored in each terminal table and it is not necessary to hold the information regarding the RSSI from another first terminal device 30.

Next, the terminal information acquisition unit 23 updates the position information associated with the terminal ID received together with the terminal information to position information included in the terminal information based on the terminal ID with reference to the first terminal table 210 in the terminal information holding unit 21. The terminal information acquisition unit 23 rewrites an update time associated with the updated position information to a current time in the first terminal table 210.

Next, the terminal information acquisition unit 23 specifies the individual terminal table 2111 associated with the terminal ID received together with the terminal information with reference to the second terminal table 211. Then, the terminal information acquisition unit 23 stores the terminal ID and the RSSI included in the terminal information received from the communication unit 26 in the specified individual terminal table 2111. The terminal information acquisition unit 23 updates an update time associated with the stored terminal ID and the stored RSSI to a current time in the specified individual terminal table 2111.

When the same terminal ID as the terminal ID included in the terminal information is already stored in the individual terminal table 2111, the terminal information acquisition unit 23 updates the RSSI associated with the same terminal ID to the RSSI included in the terminal information. The terminal information acquisition unit 23 updates the update time associated with the updated RSSI to a current time.

When the individual terminal table 2111 associated with the terminal ID received together with the terminal information is not present in the second terminal table 211, the terminal information acquisition unit 23 newly generates an empty individual terminal table 2111, stores the terminal ID and the RSSI included in the terminal information received from the communication unit 26 in the generated individual terminal table 2111, and stores a current time as the update time.

Referring to the first terminal table 210 and the second terminal table 211 in the terminal information holding unit 21, the region specifying unit 24 calculates the number of terminal devices which are likely to be present as a score for each cell of the target area by using the position information of each first terminal device 30 as a reference at predetermined timing intervals (for example, intervals of 1 minute). Then, the region specifying unit 24 associates the score calculated for each cell with the cell ID and transmits the score to the distribution information generation unit 25.

For example, the region specifying unit 24 first initializes the scores of all of the cells to 0. Referring to the first terminal table 210 in the terminal information holding unit 21, the region specifying unit 24 specifies the cell in which the position of each first terminal device 30 is contained and adds 1 to the score of the specified cell.

Next, the region specifying unit 24 selects the terminal IDs of the second terminal devices 31 one by one, referring to the second terminal table 211 in the terminal information holding unit 21, and determines whether the terminal ID of the same second terminal device 31 is stored in the different individual terminal tables 2111. When the terminal ID of the same second terminal device 31 is stored in three or more individual terminal tables 2111, the region specifying unit 24 specifies the terminal ID of the first terminal device 30 associated with each individual terminal table 2111 in the second terminal table 211.

Figure 10:
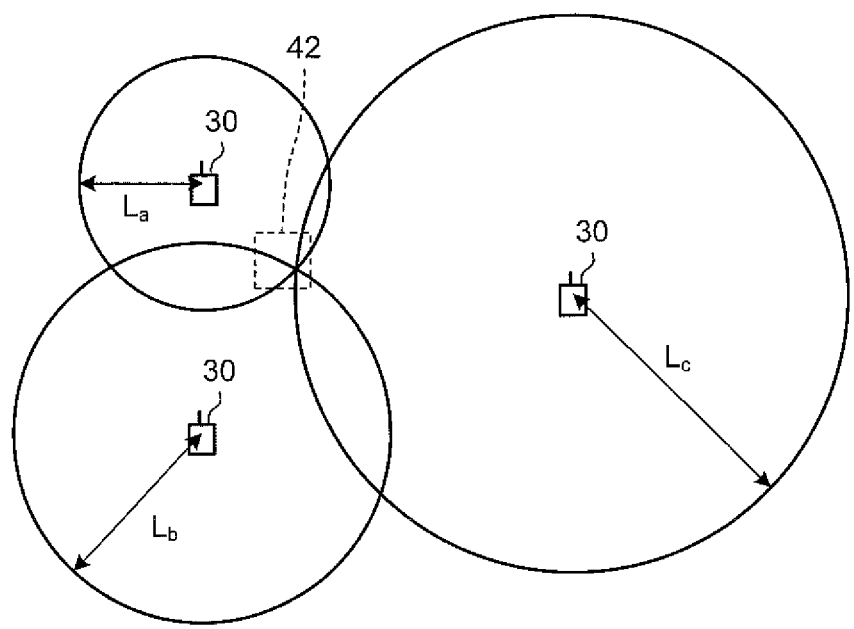
FIG. 10 is a conceptual diagram illustrating an example of a method of calculating a score of a cell.

Next, referring to the first terminal table 210, the region specifying unit 24 extracts the position information of each first terminal device 30 based on the specified terminal ID of the first terminal device 30. The region specifying unit 24 calculates distances (for example, $L_a$, $L_b$, and $L_c$ illustrated in FIG. 10) up to the first terminal devices 30 from, for example, the relation illustrated in FIG. 4 based on the RSSIs stored in each individual terminal table 2111. Then, for example, as illustrated in FIG. 10, the region specifying unit 24 specifies one cell 42 in which positions distant by the calculated distances from the positions of the first terminal devices 30 are contained and adds 1 to the score of the specified cell 42.

When the terminal ID of the same second terminal device 31 is stored in two individual terminal tables 2111, the region specifying unit 24 specifies the terminal ID of the first terminal device 30 associated with each individual terminal table 2111 in the second terminal table 211. Then, referring to the first terminal table 210, the region specifying unit 24 extracts the position information of each first terminal device 30 based on the specified terminal ID of the first terminal device 30.

Figure 11:
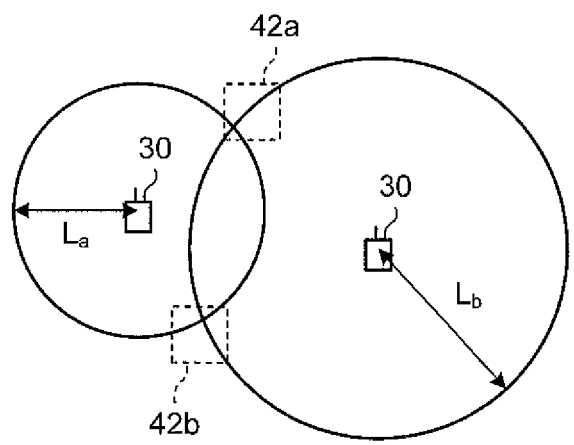
FIG. 11 is a conceptual diagram illustrating an example of a method of calculating scores of the cells.

Next, the region specifying unit 24 calculates distances (for example, $L_a$ and $L_b$ illustrated in FIG. 11) up to the first terminal devices 30 from, for example, the relation illustrated in FIG. 4 based on the RSSIs stored in each individual terminal table 2111. Then, for example, as illustrated in FIG. 11, the region specifying unit 24 specifies cells 42a and 42b in which positions distant by the calculated distances from the positions of the first terminal devices 30 are contained. The region specifying unit 24 adds 0.5 to the scores of the specified two cells 42a and 42b.

When the terminal ID of the same second terminal device 31 is not stored in different individual terminal tables 2111, the region specifying unit 24 specifies the terminal ID of the first terminal device 30 associated with the individual terminal tables 2111 in the second terminal table 211. Then, referring to the first terminal table 210, the region specifying unit 24 extracts the position information of the first terminal device 30 based on the specified terminal ID of the first terminal device 30.

Figure 12:
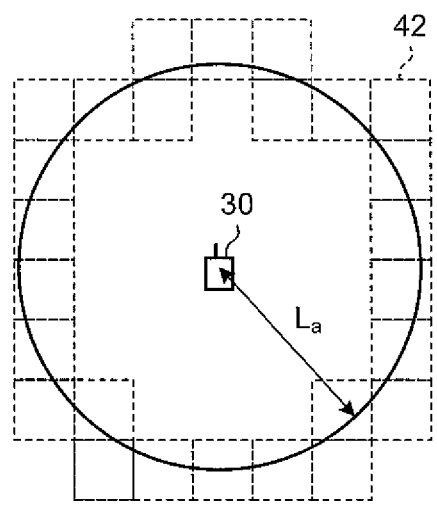
FIG. 12 is a conceptual diagram illustrating an example of a method of calculating scores of the cells.

Next, the region specifying unit 24 calculates the distances up to the first terminal devices 30 from, for example, the relation illustrated in FIG. 4 based on the RSSIs stored in the individual terminal table 2111. For example, as illustrated in FIG. 12, the region specifying unit 24 specifies all of the cells 42 in which positions distant by the calculated distances from the position of the first terminal devices 30 are contained. Then, the region specifying unit 24 counts the number of the specified cells 42 and adds a reciprocal of the number of counted cells 42 to the score of each of the specified cells 42.

In the example of FIG. 12, the region specifying unit 24 specifies 26 cells 42 in which a position distant by the calculated distance $L_a$ from the position of a first terminal device 30 is contained. Then, the region specifying unit 24 adds 1/26=0.04 (here, an approximate value of the quotient is exemplified) of the score of each of the specified cells 42.

Figure 13:
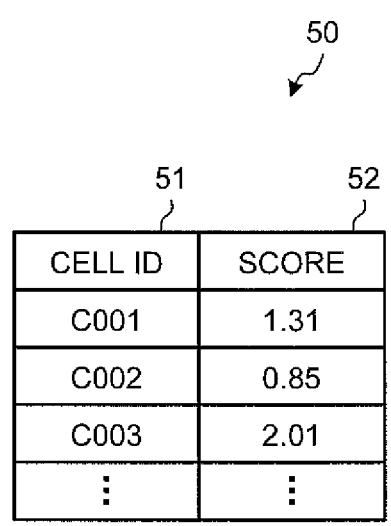
FIG. 13 is a diagram illustrating an example of a data structure of a cell table.

When the scores are added to the cells for the terminals ID of all of the second terminal devices 31 in the second terminal table 211, the region specifying unit 24 associates the cells with cell IDs 51 used to identify the cells and transmits a cell table 50 in which scores 52 of the cells are stored to the distribution information generation unit 25, for example, as illustrated in FIG. 13. FIG. 13 exemplifies the cell table 50 in which the score 52 of "1.31", is associated with the cell ID 51 of "C001", and is stored.

Figure 14:
FIG. 14 is a diagram illustrating an example of a data structure of a pattern table.

The distribution information generation unit 25 receives and holds the cell table 50 from the region specifying unit 24. For example, as illustrated in FIG. 14, the distribution information generation unit 25 holds a pattern table 60 in which a pattern 62 associated with a range 61 of each score and is allocated to the cell corresponding to the score within the range 61 is stored. Each pattern 62 stored in the pattern table 60 differs in appearance (for example, color, density, saturation, design, or the like) for each range 61 of the score.

When the distribution information generation unit 25 receives a distribution information request from the communication unit 26, the distribution information generation unit 25 extracts the score of each cell referring to the cell table 50 and extracts the pattern corresponding to the extracted score from the pattern table 60. Then, the distribution information generation unit 25 generates distribution information in which the extracted pattern is allocated to each cell and transmits the generated distribution information to the communication unit 26.

Process of Server

Figure 15:
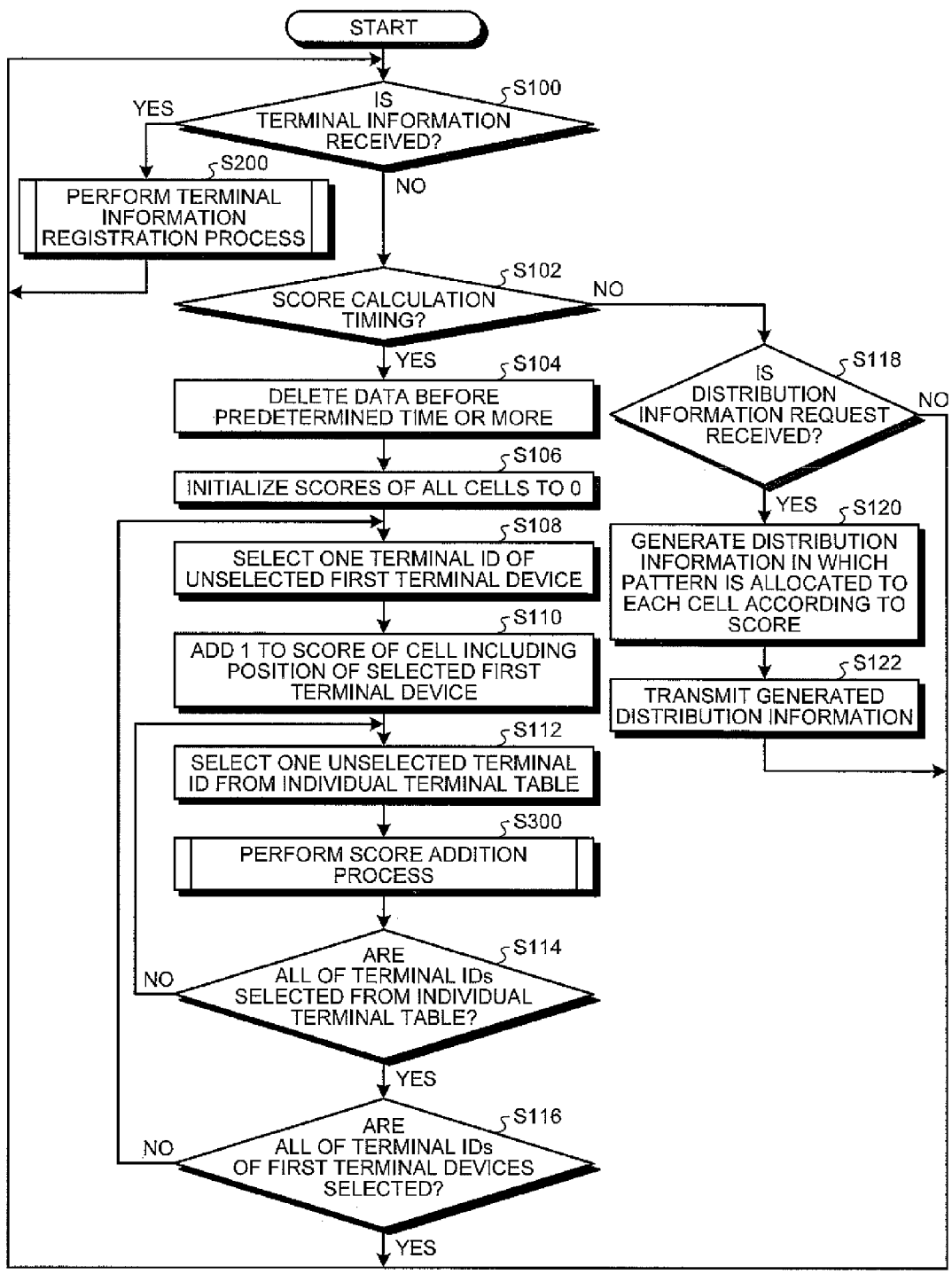
FIG. 15 is a flowchart illustrating an example of a process of the server.

FIG. 15 is a flowchart illustrating an example of a process of the server 20.

First, the terminal information acquisition unit 23 determines whether the terminal information and the terminal ID are received from the second terminal device 31 via the communication unit 26 (S100). When the terminal information and the terminal ID are received (Yes in S100), the terminal information acquisition unit 23 performs a terminal information registration process to be described below (S200) and performs the process illustrated in step S100 again.

When the terminal information and the terminal ID are not received (No in S100), the region specifying unit 24 determines whether the current time is a timing at which the score of each cell is calculated (S102). When the current time is the timing at which the score of each cell is calculated (Yes in S102), the region specifying unit 24 retrieves an update time before a predetermined time or more, referring to the first terminal table 210 and the second terminal table 211 in the terminal information holding unit 21.

When the update time before the predetermined time or more is retrieved in the first terminal table 210, the region specifying unit 24 deletes the record 2103 including the update time from the first terminal table 210 (S104). When the update time before the predetermined time or more is retrieved in the second terminal table 211, the region specifying unit 24 deletes the record 2115 including the update time from the second terminal table 211 (S104).

Next, the region specifying unit 24 initializes the scores of all of the cells to 0 in the cell table 50 (S106). Then, the region specifying unit 24 selects one terminal ID of the unselected first terminal device 30, referring to the first terminal table 210 in the terminal information holding unit 21 (S108). Then, the region specifying unit 24 extracts the position information associated with the selected terminal ID from the first terminal table 210 and adds 1 to the score stored in the cell table 50 associated with the cell ID of the cell including the position indicated by the extracted position information (S110).

Next, the region specifying unit 24 specifies the individual terminal table 2111 associated with the terminal ID of the first terminal device 30 selected in step S108 in the second terminal table 211. Then, the region specifying unit 24 selects one unselected terminal ID in the specified individual terminal table 2111 (S112). Then, the region specifying unit 24 performs a score addition process to be described below (S300).

Next, the region specifying unit 24 determines whether all of the terminal IDs stored in the individual terminal table 2111 associated with the terminal ID of the first terminal device 30 selected in step S108 are selected (S114). When there is the unselected terminal ID in the individual terminal table 2111 (No in S114), the region specifying unit 24 performs the process illustrated in step S112 again.

When all of the terminal IDs stored in the individual terminal table 2111 are selected (Yes in S114), the region specifying unit 24 determines whether the terminal IDs stored in the first terminal table 210 are selected (S116). When there is the unselected terminal ID in the first terminal table 210 (No in S116), the region specifying unit 24 performs the process illustrated in step 3108 again. When all of the terminal IDs stored in the first terminal table 210 are selected (Yes in S116), the region specifying unit 24 transmits the cell table 50 to the distribution information generation unit 25 and the terminal information acquisition unit 23 performs the process illustrated in step S100 again.

When the current time is not the timing at which the score of each cell is calculated (No in S102), the distribution information generation unit 25 determines whether a distribution information request is received via the communication unit 26 (S118). When the distribution information request is not received (No in S118), the terminal information acquisition unit 23 performs the process illustrated in step S100 again.

When the distribution information request is received (Yes in S118), the distribution information generation unit 25 extracts the score for each cell referring to the cell table 50 and extracts the pattern according to the extracted score from the pattern table 60. Then, the distribution information generation unit 25 generates the distribution information in which the extracted pattern is allocated to each cell (S120). Then, the distribution information generation unit 25 transmits the generated distribution information to the transmission source of the distribution information request via the communication unit 26 (S122) and the terminal information acquisition unit 23 performs the process illustrated in step S100 again.

Terminal Information Registration Process

Figure 16:
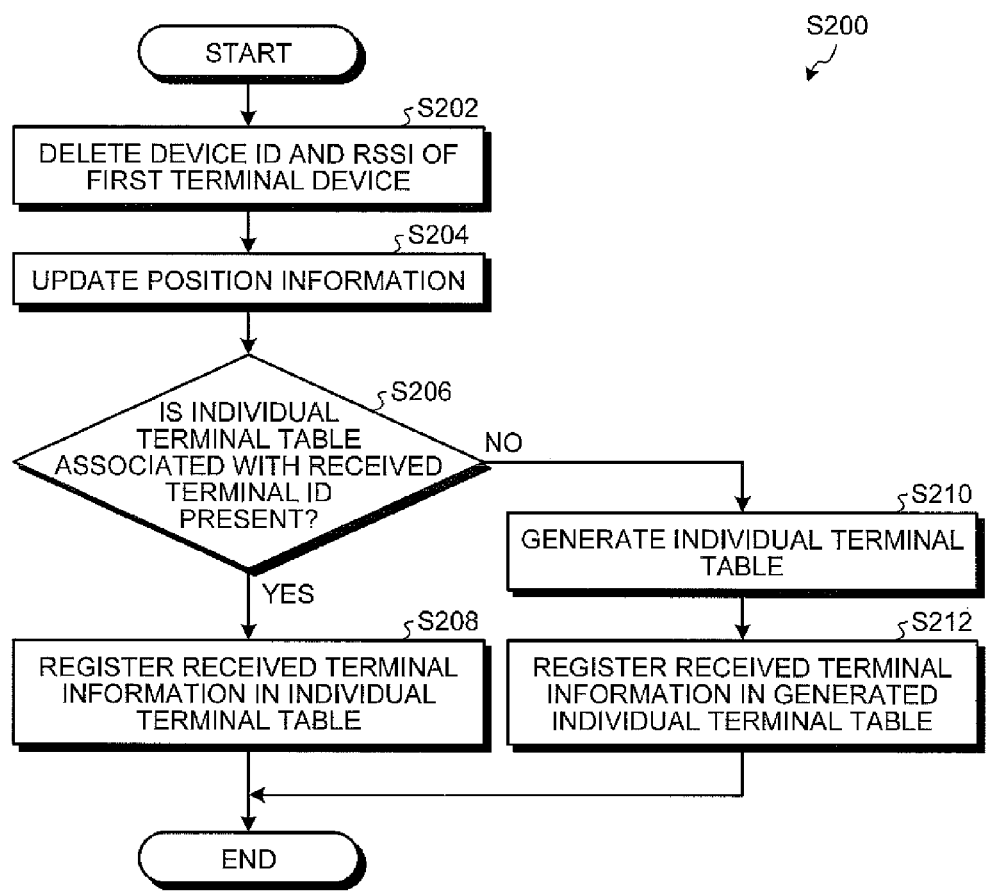
FIG. 16 is a flowchart illustrating an example of a terminal information registration process (S200)

FIG. 16 is a flowchart illustrating an example of the terminal information registration process (S200).

First, the terminal information acquisition unit 23 deletes the terminal ID and the RSSI from the first terminal device 30 among the terminal IDs included in the terminal information received from the second terminal devices 31 via the communication unit 26 (S202). Then, based on the terminal ID received together with the terminal information, the terminal information acquisition unit 23 updates the position information associated with the terminal. ID to the position information included in the terminal information, referring to the first terminal table 210 in the terminal information holding unit 21 (S204). The terminal information acquisition unit 23 rewrites the update time associated with the updated position information to a current time in the first terminal table 210.

Next, the terminal information acquisition unit 23 determines whether the individual terminal table 2111 associated with the terminal ID received together with the terminal information is present, referring to the second terminal table 211 (S206). When the individual terminal table 2111 is present in the second terminal table 211 (Yes in S206), the terminal information acquisition unit 23 registers the terminal ID and the RSSI included in the terminal information received from the communication unit 26 in the individual terminal table 2111 (S208). Then, the terminal information acquisition unit 23 registers the current time in the update time associated with the registered terminal ID and the registered RSST in the individual terminal table 2111 and ends the process illustrated in this flowchart.

Conversely, when the individual terminal table 2111 associated with the terminal. ID received together with the terminal information is not present in the second terminal table 211 (No in S206), the terminal information acquisition unit 23 newly generates an empty individual terminal table 2111 in the second terminal table 211 by associating the empty individual terminal table 2111 with the terminal ID (S210). The terminal information acquisition unit 23 registers the terminal ID and the RSSI included in the terminal information in the generated individual terminal table 2111 (S212). The terminal information acquisition unit 23 registers the current time as the update time by associating the current time with the registered terminal ID and the registered RSSI in the individual terminal table 2111 and ends the process illustrated in this flowchart.

Score Addition Process

Figure 17:
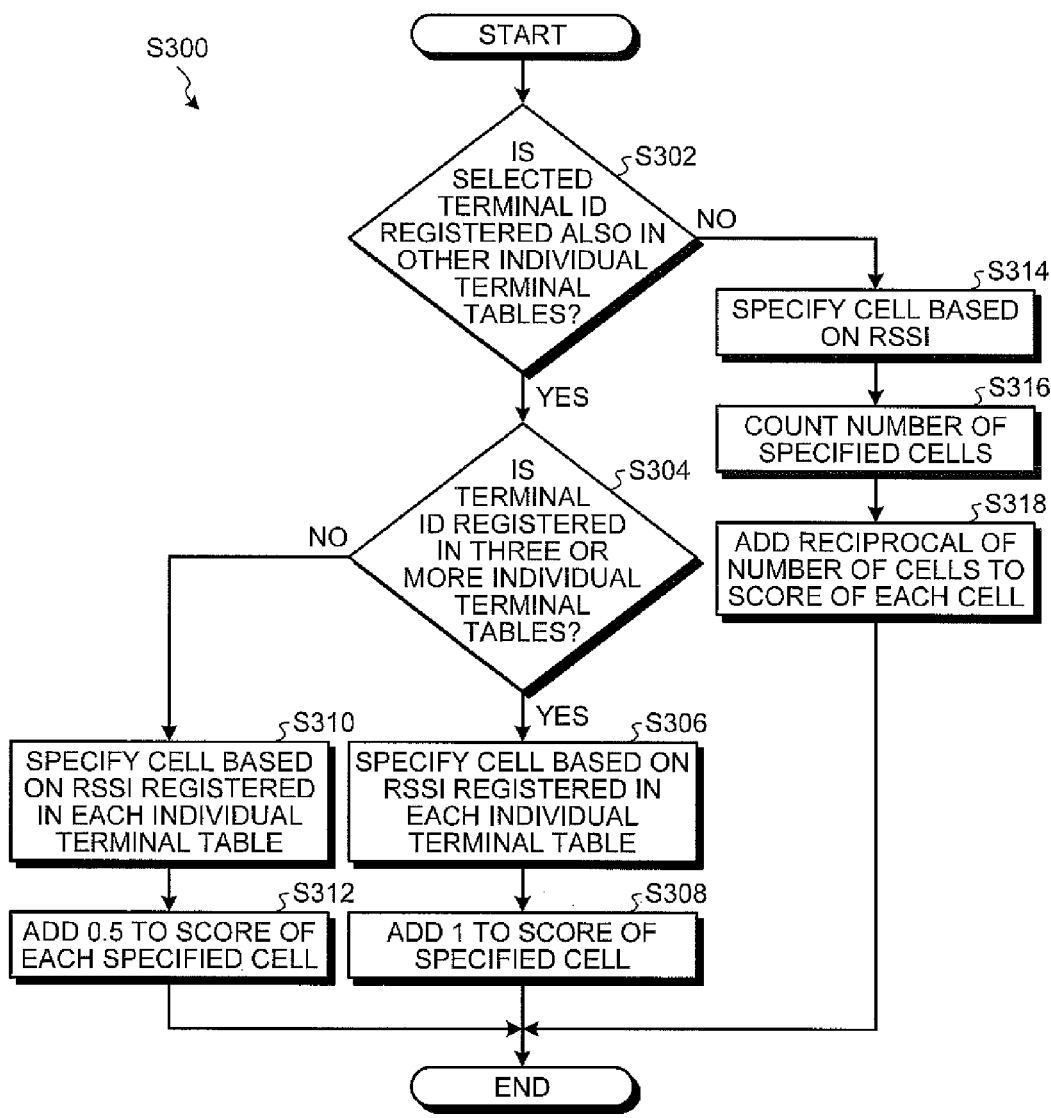
FIG. 17 is a flowchart illustrating an example of a score addition process (S300)

FIG. 17 is a flowchart illustrating an example of the score addition process (S300).

First, the region specifying unit 24 determines whether the terminal ID selected in step S112 is also registered in the other individual terminal tables (S302). When the terminal ID selected in step S112 is registered also in the other individual terminal tables (Yes in S302), the region specifying unit 24 determines whether the terminal ID selected in step S112 is registered in three or more individual terminal tables (S304).

When the terminal ID selected in step S112 is registered in the three or more individual terminal table (Yes in S304), the region specifying unit 24 extracts the RSSI registered in each individual terminal table for each first terminal device 30 corresponding to this individual terminal table. For example, as described in FIG. 10, the region specifying unit 24 specifies the cell located at the distance corresponding to the corresponding RSSI from the position of each first terminal device 30 (S306). The region specifying unit 24 adds 1 to the score associated with the cell ID of the specified cell in the cell table 50 (S308) and the region specifying unit 24 ends the process illustrated in this flowchart.

When the terminal ID selected in step S112 is registered in the individual terminal tables of the number less than three (Yes in S304), that is, when the terminal ID selected in step S112 is registered in two individual terminal tables, the region specifying unit 24 extracts the RSSI registered in each individual terminal table for each first terminal device 30 corresponding to this individual terminal table.

For example, as described in FIG. 11, the region specifying unit 24 specifies two cells located at the distance corresponding to the corresponding RSSI from the position of each first terminal device 30 (S310). The region specifying unit 24 adds 0.5 to the score associated with the cell ID of each specified cell in the cell table 50 (S312) and the region specifying unit 24 ends the process illustrated in this flowchart.

When the terminal ID selected in step S112 is not registered in any individual terminal table (No in S302), the region specifying unit 24 extracts the RSSI associated with the terminal ID selected in step S112 from the individual terminal table. For example, as described in FIG. 12, the region specifying unit 24 specifies a plurality of cells located at the distances corresponding to the corresponding RSSIs from the position of the first terminal device 30 (S314).

Next, the region specifying unit 24 counts the number of specified cells (S316). The region specifying unit 24 adds the reciprocal of the number of counted cells to the score associated with the cell ID of each of the specified cells in the cell table 50 (S318) and the region specifying unit 24 ends the process illustrated in this flowchart.

Hardware Configuration of Server

Figure 18:
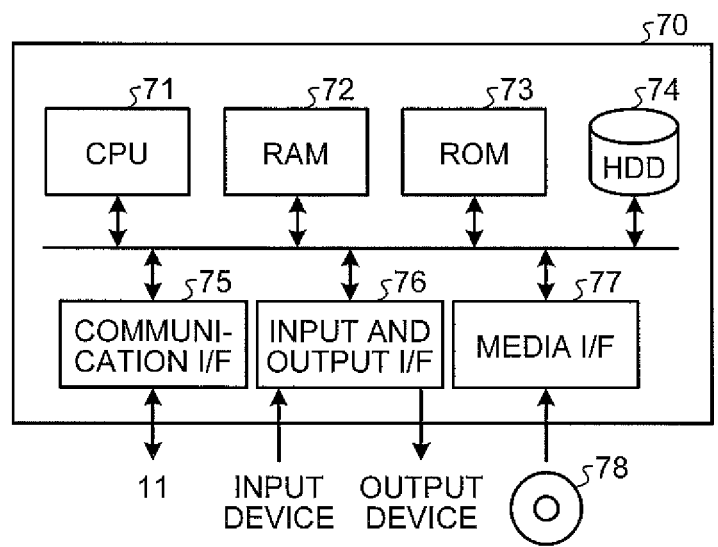
FIG. 18 is a diagram illustrating an example of a hardware configuration of a computer that realizes functions of the server.

FIG. 18 is a diagram illustrating an example of a hardware configuration of a computer 70 that realizes the functions of the server 20. The computer 70 includes a central processing unit (CPU) 71, a random access memory (RAM) 72, a read-only memory (ROM) 73, a hard disk drive (HDD) 74, a communication interface (I/F) 75, an input and output interface (I/F) 76, and a media interface (I/F) 77.

The CPU 71 operates based on a program stored in the ROM 73 or the HDD 74 and controls each unit. The ROM 73 stores, for example, a boot program performed by the CPU 71 at the time of activation of the computer 70 or a program dependent on hardware of the computer 70.

The HDD 74 stores, for example, a program executed by the CPU 71 and data used by the program. The communication interface 75 receives data from another device via a communication line 11, transmits the data to the CPU 71, and transmits data generated by the CPU 71 to another device via the communication line 11.

The CPU 71 controls an output device such as a display or a printer or an input device such as a keyboard or a mouse via the input and output interface 76. The CPU 71 acquires data from the input device via the input and output interface 76. The CPU 71 outputs generated data to the output device via the input and output interface 76.

The media interface 77 reads a program or data stored in a recording medium 78 and supplies the program or the data to the CPU 71 via the RAM 72. The CPU 71 loads the program on the RAM 72 from the recording medium 78 via the media interface 77 and executes the loaded program. The recording medium 78 is, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

The CPU 71 of the computer 70 realizes the functions of the terminal information holding unit 21, the map information holding unit 22, the terminal information acquisition unit 23, the region specifying unit 24, the distribution information generation unit 25, and the communication unit 26 by executing a program loaded on the RAM 72. The ROM 73 or the HEM 74 stores data held in the terminal information holding unit 21 and the map information holding unit 22.

The CPU 71 of the computer 70 reads the program from the recording medium 78 and executes the program. As another example, the CPU 71 may acquire the program from another device via the communication line 11. The data held in the terminal information holding unit 21 and the map information holding unit 22 may be stored in another server different from the server 20, and the server 20 may acquire the data from the other server.

The embodiment has been described above. As apparent from the above description, in the distribution information generation system 10 according to the embodiment, it is possible to reduce the installation cost or the work load of the device installation at the time of generation of information indicating a distribution of people within an area.

OTHER EMBODIMENTS

In the above-described embodiment, when a distance between two first terminal devices 30 is less than a predetermined distance (for example, 0.5 m), the region specifying unit 24 may treat the terminal information transmitted from the two first terminal devices 30 as terminal information transmitted from one first terminal device 30. Thus, the server 20 can specify the position of the second terminal device 31 with higher accuracy.

In this case, the region specifying unit 24 may use the position of one of the first terminal devices 30 or a middle point of the positions of two first terminal devices 30 as a representative position of the positions of two first terminal devices 30. When the RSSIs from the second terminal devices 31 included in the terminal information transmitted from each of the first terminal devices 30 are different, the higher value may be used. Thus, the server 20 can use the information of higher reception sensitivity regarding the first terminal device 30.

When the second terminal devices 31 included in the terminal information transmitted from each of the first terminal devices 30 are different (that is, the information regarding the second terminal devices 31 included in one piece of terminal information is not included in the other piece of terminal information), the information regarding the second terminal devices 31 included in each of the terminal information may be merged. Thus, there is a high possibility that the server 20 can detect the presence of the second terminal devices 31 with higher accuracy.

When a distance between two first terminal devices 30 is less than a predetermined distance (for example, 0.5 m) and the RSSIs from the same second terminal device 31 included in the terminal information transmitted from the first terminal devices 30 are different, the region specifying unit 24 calculates a difference between the RSSIs. Then, the region specifying unit 24 may perform correction by adding the calculated difference to the RSSI subsequently reported from the first terminal device 30 having reported the lower RSSI. Thus, since the server 20 can correct the difference in the reception sensitivity, the server 20 can calculate a distance from the second terminal device 31 to the first terminal device 30 with higher accuracy.

The process performed to calculate the position of the first terminal device 30 based on the radio wave from the access point 12 by each first terminal device 30 may be performed by the server 20. In this case, the configurations corresponding to the position calculation unit 301 and the map information holding unit 302 are installed in the server 20. The first terminal device 30 measures the RSSI of the radio waves received from the access point 12, and then associates the measured RSSI with the access point ID of the access point 12 and transmits the RSSI to the server 20. The server 20 calculates the position of the first terminal device 30 based on a pair of the RSSI and the access points ID transmitted from the first terminal device 30.

In the server according to the embodiment, it is possible to reduce the installation cost or the work load of the device installation at the time of the generation of the information indicating a distribution of people within an area.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A server that generates information indicating a distribution of positions of terminal devices, the server comprising:
    an acquisition unit configured to acquire from each of a plurality of first terminal devices, terminal information including measurement information used to calculate a distance from each of second terminal devices to each of the plurality of first terminal devices for each second terminal device present near the first terminal device and position information of the first terminal device;
    a specifying unit configured to specify a region in which the second terminal device is disposed at a distance according to the measurement information from the position of each of the first terminal devices; and
    a generation unit configured to generate the information indicating the distribution of the positions of the first and second terminal devices based on the region specified by the specifying unit,
    wherein the measurement information is a reception strength when the first terminal device receives a radio wave transmitted from the second terminal device,
    wherein the specifying unit specifies the region in which the second terminal device is disposed at a distance according to the reception strength, and
    wherein, when positions of two first terminal devices are less than a predetermined distance from each other and the reception strengths from the same second terminal device acquired from the two first terminal devices are different, the specifying unit uses a reception strength from the first terminal device reporting a higher value of the reception strengths as the reception strength from the same second terminal device, the predetermined distance being a distance at which terminal information transmitted from the two first terminal devices can be considered as terminal information transmitted from one of the two first terminal devices.

2. The server according to claim 1,
    wherein the specifying unit
    divides a target region indicating the distribution of the positions of the first and second terminal devices into a plurality of small regions,
    counts the number of small regions located at distances according to the reception strengths from the position of the first terminal devices for each second terminal, and
    adds a value according to the number of counted small regions to a score associated with each of the counted small regions, and
    wherein the generation unit generates the information indicating the distribution of the positions of the first and second terminal devices by allocating a display pattern according to the scores associated with the small regions to each small region.

3. The server according to claim 2,
    wherein the specifying unit adds a reciprocal of the number of counted small regions to the score associated with each of the counted small regions.

4. The server according to claim 2,
    wherein the display pattern is color, density, saturation, or design according to the score.

5. The server according to claim 2,
    wherein, when the reception strength from the same second terminal device is included in the terminal information acquired from two first terminal devices, the specifying unit specifies two small regions located at a distance according to each of the reception strengths from the position of each of the two first terminal device with regard to the same second terminal device.

6. The server according to claim 2,
    wherein, when the reception strength from the same second terminal device is included in the terminal information acquired from three first terminal devices, the specifying unit specifies one small region located at a distance according to each of the reception strengths from the position of each of the three first terminal device with regard to the same second terminal device.

7. A distribution information generation method executed by a server that generates information indicating a distribution of positions of terminal devices, the method comprising:
    acquiring from each of a plurality of first terminal devices, terminal information including measurement information used to calculate a distance from each of second terminal devices to each of the plurality of first terminal devices for each second terminal device present near the first terminal device and position information of the first terminal device;
    specifying a region in which the second terminal device is disposed at a distance according to the measurement information from the position of each of the first terminal devices; and generating the information indicating the distribution of the positions of the first and second terminal devices based on the specified region, wherein the measurement information is a reception strength when the first terminal device receives a radio wave transmitted from the second terminal device, wherein in the specifying of the region in which the second terminal device is disposed, the server specifies the region in which the second terminal device is disposed at a distance according to the reception strength, and wherein in the specifying of the region in which the second terminal device is disposed, the server corrects a reception strength from the first terminal device reporting a low value using a reception strength from the first terminal device reporting a high value, when positions of two first terminal devices are less than a predetermined distance from each other and the reception strengths from the same second terminal device acquired from the two first terminal devices are different, using a reception strength from the first terminal device reporting a higher value of the reception strengths as the reception strength from the same second terminal device, the predetermined distance being a distance at which terminal information transmitted from the two first terminal devices can be considered as terminal information transmitted from one of the two first terminal devices.

8. The distribution information generation method according to claim 7, wherein in the specifying of the region in which the second terminal device is disposed, the server divides a target region indicating the distribution of the positions of the first and second terminal devices into a plurality of small regions, counts the number of small regions located at distances according to the reception strengths from the position of the first terminal devices for each second terminal, and adds a value according to the number of counted small regions to a score associated with each of the counted small regions, and wherein in the generating of the information indicating the distribution of the positions of the first and second terminal devices, the server generates the information indicating the distribution of the positions of the first and second terminal devices by allocating a display pattern according to the scores associated with the small regions to each small region.

9. The distribution information generation method according to claim 8, wherein in the specifying of the region in which the second terminal device is disposed, the server adds a reciprocal of the number of counted small regions to the score associated with each of the counted small regions.

10. The distribution information generation method according to claim 8, wherein the display pattern is color, density, saturation, or design according to the score.

11. The distribution information generation method according to claim 8, wherein in the specifying of the region in which the second terminal device is disposed, when the reception strength from the same second terminal device is included in the terminal information acquired from two first terminal devices, the server specifies two small regions located at a distance according to each of the reception strengths from the position of each of the two first terminal device with regard to the same second terminal device.

12. The distribution information generation method according to claim 8, wherein in the specifying of the region in which the second terminal device is disposed, when the reception strength from the same second terminal device is included in the terminal information acquired from three first terminal devices, the server specifies one small region located at a distance according to each of the reception strengths from the position of each of the three first terminal device with regard to the same second terminal device.

13. A non-transitory computer readable recording medium that stores a program causing a computer to function as a server that generates information indicating a distribution of positions of terminal devices, wherein the program causing the computer to perform:

acquiring from each of a plurality of first terminal devices, terminal information including measurement information used to calculate a distance from each of second terminal devices to each of the plurality of first terminal devices for each second terminal device present near the first terminal device and position information of the first terminal device;

specifying a region in which the second terminal device is disposed at a distance according to the measurement information from the position of each of the first terminal devices; and generating the information indicating the distribution of the positions of the first and second terminal devices based on the specified region, wherein the measurement information is a reception strength when the first terminal device receives a radio wave transmitted from the second terminal device, wherein in the specifying of the region in which the second terminal device is disposed, the server specifies the region in which the second terminal device is disposed at a distance according to the reception strength, and wherein in the specifying of the region in which the second terminal device is disposed, the server corrects a reception strength from the first terminal device reporting a low value using a reception strength from the first terminal device reporting a high value, when positions of two first terminal devices are less than a predetermined distance from each other and the reception strengths from the same second terminal device acquired from the two first terminal devices are different, using a reception strength from the first terminal device reporting a higher value of the reception strengths as the reception strength from the same second terminal device, the predetermined distance being a distance at which terminal information transmitted from the two first terminal devices can be considered as terminal information transmitted from one of the two first terminal devices.

* * * * *